US005574978A

United States Patent [19]
Talwar et al.

[11] Patent Number: 5,574,978
[45] Date of Patent: Nov. 12, 1996

[54] INTERFERENCE CANCELLATION SYSTEM AND RADIO SYSTEM FOR MULTIPLE RADIOS ON A SMALL PLATFORM

[75] Inventors: Ashok K. Talwar, Westlake Village; Barry F. Fitzgerald, Agoura Hills; Mark B. Bahu, Ventura, all of Calif.

[73] Assignee: American Nucleonics Corporation, Westlake Village, Calif.

[21] Appl. No.: 242,160

[22] Filed: May 12, 1994

[51] Int. Cl.$^6$ ............................... H04B 1/10; H04B 15/00
[52] U.S. Cl. ............................. 455/63; 455/673; 455/82; 455/83; 455/296; 455/303
[58] Field of Search .................... 455/63, 19, 24, 455/84, 296, 278.1, 136, 82, 83, 78, 50.1, 67.3, 303

[56] References Cited

U.S. PATENT DOCUMENTS

| | | | |
|---|---|---|---|
| 3,656,162 | 4/1972 | Mee | 343/180 |
| 3,699,444 | 10/1972 | Ghose et al. | 325/21 |
| 5,054,114 | 10/1991 | Erickson | 455/82 |
| 5,117,505 | 5/1992 | Talwar | 455/278.1 |
| 5,140,699 | 8/1992 | Kozak | 455/84 |
| 5,148,117 | 9/1992 | Talwar | |
| 5,152,010 | 9/1992 | Talwar | 455/136 |
| 5,170,493 | 12/1992 | Roth | 455/83 |
| 5,428,831 | 6/1995 | Monzello et al. | 455/296 |

OTHER PUBLICATIONS

Rabindra N. Ghose, "Collocation of Receivers and High-Power Broadcast Tranmitters", *IEEE Transactions on Broadcasting*, vol. 34, No. 2: 154–158 (Jun. 1988).

Primary Examiner—Reinhard J. Eisenzopf
Assistant Examiner—Gertrude Arthur
Attorney, Agent, or Firm—Hoffmann & Baron

[57] ABSTRACT

A radio system and interference cancellation system for use with the radio system include a receiving radio and a transmitting radio which are coupled to a common antenna. A reference coupler provides a reference signal in response to the signal transmitted by the transmitting radio and provides the reference signal to a vector modulator and a synchronous detector. A receiver coupler is responsive to the transmitted signal which is reflected by the antenna and to the signal which is desired to be received and provides a received signal containing an interfering signal component and a desired signal component. An error coupler samples the received signal which includes any residual interfering signal component after cancellation, and provides an error signal to the synchronous detector. The synchronous detector compares the reference signal with the error signal and provides a detector output to the vector modulator. The vector modulator adjusts the phase and amplitude of the reference signal and generates a cancellation signal from the reference signal, which cancellation signal is summed with the received signal to cancel the interfering signal component, leaving the desired signal.

11 Claims, 3 Drawing Sheets

INTERFERENCE CANCELLATION SYSTEM AND RADIO SYSTEM FOR MULTIPLE RADIOS ON A SMALL PLATFORM

BACKGROUND OF THE INVENTION

1. Field Of The Invention

The present invention relates to interference cancellation systems and radio systems, and more particularly relates to interference cancellation systems operable with multiple radios.

2. Description Of The Prior Art

To facilitate an understanding of the present invention, the following description of a basic interference cancellation system is provided.

FIG. 1 shows a conventional interference cancellation system for operation with two radio systems having radios 1,2. It is assumed that first radio 1 is in the transmitting mode and the second radio 2 is in the receiving mode. Each of radio 1 and radio 2 is connected to its own antenna 6,8 for transmitting and receiving signals, each antenna 6,8 being shown connected to its respective radio by a transmission line 10,12. The signal transmitted by radio 1 is an interfering signal which is received by radio 2 through its respective antenna 8 and interferes with the ability of radio 2 to receive a desired signal. Hence, an interference cancellation system is employed and is connected between the first radio system and the second radio system to cancel the interfering signal component in the signal received by radio 2.

The conventional interference cancellation system includes a first directional coupler 14, referred to as a reference coupler, which is coupled to the transmission line 10 of the first radio system to obtain a sample of the transmitted signal (i.e., the interfering signal). This sample of the interfering signal is commonly referred to as the reference signal. Similarly, a second directional coupler 16, which is commonly referred to as an error coupler, is connected to the transmission line 12 of the second radio system to sample the received signal on the transmission line, which received signal includes an interfering signal component and a desired signal component. This sample of the received signal is commonly referred to as an error signal.

The interference cancellation system also includes a synchronous phase detector 18 and a vector modulator 20 (also known as a signal controller). A portion of the reference signal is provided to the reference input port of the synchronous phase detector 18 using another directional coupler 22, and the error signal is provided to the error input port of the synchronous detector. The synchronous detector 18 compares the two signals, and generates two detector output signals which vary in accordance with the differences in amplitude and phase between the reference signal and the error signal.

Each of the detector output signals may be provided to an integrator/amplifier 24, which will provide time varying, DC control signals which vary in response to the detector output signals. These control signals are provided to the vector modulator 20.

The vector modulator 20 receives a portion of the reference signal and adjusts the amplitude and phase of the reference signal in response to the control signals it receives from the synchronous detector (via the integrators/amplifiers 24). The vector modulator 20 generates a cancellation signal which is injected onto the transmission line of the second radio system using a fourth directional coupler 26, also known as a summing coupler. The cancellation signal has an equal amplitude but an opposite phase to that of the interfering signal component received by the second radio system, thereby cancelling the interfering signal component from the received signal.

Thus, the interference cancellation system automatically and continuously maintains the amplitude and phase of the cancellation signal for maximum cancellation of the interfering signal component from the signal received by second radio system. This conventional system is described in in U.S. Pat. No. 5,152,010 entitled "Highly Directive Radio Receiver Employing Relatively Small Antennas", which issued on Sep. 29, 1992 to Ashok K. Talwar, one of the inventors herein, the disclosure of which is incorporated herein by reference.

The effectiveness of the interference cancellation system described above and shown in FIG. 1 is degraded when the isolation between the two antennas 6,8 is low. This occurs with collocated radios, and is especially a significant problem when the antennas of the radio systems must be closely situated to each other, such as when they are mounted on a small platform, such as an aircraft, with very little room for providing spacing between the antennas. The coupling between the two antennas may be as much as 6 dB. Because of this high coupling and low isolation between the two antennas, the interference caused by the power radiated by the transmitting radio degrades the performance of the receiving radio located on the same platform. The conventional method of interference cancellation may not be effectively employed because the power of the reference signal required to cancel the large interfering signal component in the received signal after overcoming reference and summing coupler losses and losses in the vector modulator may not be available.

For example, the vector modulator 20 (i.e., signal controller) may have as much 10 dB in losses, and each of the reference and summing couplers may have 10 dB in losses associated with them. Thus, there may be 30 dB in losses in the reference signal path of the interference cancellation system, while only 6 dB between the antennas of the transmitting radio system and the receiving radio system. Thus, the interfering signal component in the received signal of radio 2 might always be stronger than the reference signal tapped from the transmitting radio system after passing through the high losses associated with the reference signal path of the interference cancellation system. This problem is especially acute with collocated radios with their antennas closely spaced together, such as on a small platform. Thus, when the isolation between the two antennas is low, the coupled reference power may be insufficient to provide cancellation.

One attempt to overcome this problem is to take additional power from the transmitting radio and couple it through the reference signal path so that the reference signal and the cancellation signal have sufficient power to cancel the interference signal component in the received signal of radio 2. A problem with this approach is that now the transmitted power is decreased and may be much less than the coupled reference signal power.

A second approach to resolving this problem is to add an attenuator to the receiver transmission line 12 to introduce excessive loss at the output of the receiving antenna 8. This, of course, reduces the receive sensitivity of radio 2. With either approach, communication link performance is greatly degraded.

An amplifier may also be added in the reference signal path either before or after the vector modulator 20. Such an amplifier would have to have high power to overcome the losses in the reference signal path. This approach to the problem may result in distortion to the cancellation signal and the introduction of more noise to the system.

Another major disadvantage of having multiple radios collocated on a small platform, each having its own antenna, is that performance of the radios is degraded by the proximity of the antennas to each other, which causes the antenna pattern of each antenna to be distorted. This will reduce the range capabilities of the communication link between the radios on the small platform and a remote receiver or transmitter.

OBJECTS AND SUMMARY OF THE INVENTION

It is an object of the present invention to provide an interference cancellation system and method for use with multiple radios situated on a small platform.

It is another object of the present invention to provide an interference cancellation system for multiple radios situated in close proximity to each other, which system provides increased isolation between transmitting and receiving radios.

It is a further object of the present invention to provide an interference cancellation system for closely situated radios, where the signal loss in the reference signal path through the interference cancellation system is less than the coupling between the radios.

It is still another object the present invention to provide a multiple radio system employing a single antenna and having interference suppression capabilities between radios of the system.

It is yet a further object of the present invention to provide a multiple radio system employing a single antenna having a good input match and high return loss.

It is yet another object of the present invention to provide an interference cancellation system which overcomes the disadvantages of known interference cancellation systems.

In accordance with one form of the present invention, an interference cancellation system is particularly designed for use with two or more radios where at least one radio receives a desired signal and at least another radio generates a transmitted signal which interferes with the desired signal. The two radios are situated in close proximity to each other, such as on a small platform, as with a helicopter or airplane. The two radios share a common antenna for receiving and transmitting signals. The common antenna reflects a portion of the transmitted signal and thus generates a reflected transmitted signal.

In accordance with the present invention, the interference cancellation system includes a reference coupler. The reference coupler is responsive to the transmitted signal and provides a reference signal in response to the transmitted signal.

The interference cancellation system also includes a receiver coupler. The receiver coupler is response to the reflected transmitted signal and the desired signal and provides a received signal in response to these two signals. The received signal includes an interfering signal component corresponding to the reflected transmitted signal and a desired signal component corresponding to the desired signal.

The interference cancellation system further includes an error coupler. The error coupler is responsive to the received signal and provides an error signal in response to the received signal.

The interference cancellation system also includes a synchronous detector. The synchronous detector is responsive to the error signal and to a first portion of the reference signal and generates at least one detector output signal in response to these two signals.

The cancellation system also includes a vector modulator. The vector modulator is responsive to the detector output signal and to a second portion of the reference signal. The vector modulator generates a cancellation signal in response to the detector output signal and the second portion of the reference signal. The cancellation signal is adjusted by the system to be substantially equal in amplitude and opposite in phase to the interfering signal component of the received signal.

The interference cancellation system of the present invention additionally includes a summing coupler. The summing coupler is responsive to the received signal and to the cancellation signal. It is provided for summing the cancellation signal and the received signal and thereby cancels the interfering signal component from the received signal, so that the desired signal remains and is received by the receiving radio.

The present invention also relates to a radio system which has interference suppression capabilities. The radio system has a plurality of radios, some of which may be transmitting radios and others of which may be receiving radios. The transmitting and receiving radios are coupled to a common antenna. The radios have connected to them the interference cancellation system previously described.

The radio system described above is adapted for use on small platforms, such as an airplane or helicopter. Instead of each radio having its own antenna, as in a conventional system where, because of the close proximity of the radios and antennas to each other, the antenna pattern of each radio is distorted, a common antenna is used to which the various radios are coupled. In this way, the common antenna may be located more centrally on the small platform (since space is a constraint) to provide a better ground plane such that quarter wave antennas or other types requiring a ground plane may be more effectively used and so that a more perfect antenna which more closely matches the radios coupled to it and having a low (i.e., ideally equal to 1) voltage standing wave ratio (VSWR) may be used.

Because a more perfect antenna is used (with very little mismatch between the antenna and the system to which it is coupled), only a small amount of the transmitted signal from those radios that are transmitting will be reflected back from the common antenna. Thus, the interfering signal component of the received signal, which corresponds to the reflected transmitted signal, will be kept to a relatively low power. However, the reference signal generated by the interference cancellation system of the present invention, which is a sample of the transmitted signal from one or more of the transmitting radios, will be stronger than the interfering signal component of the received signal so that now the interference cancellation system of the present invention is capable of generating an effective cancellation signal to cancel the interfering signal component from the received signal, leaving the desired signal to be passed on to the receiving radio of the radio system.

These and other objects, features and advantages of this invention will become apparent from the following detailed

DETAILED DESCRIPTION OF THE PREFERRED EMBODIMENTS

Figure 1:
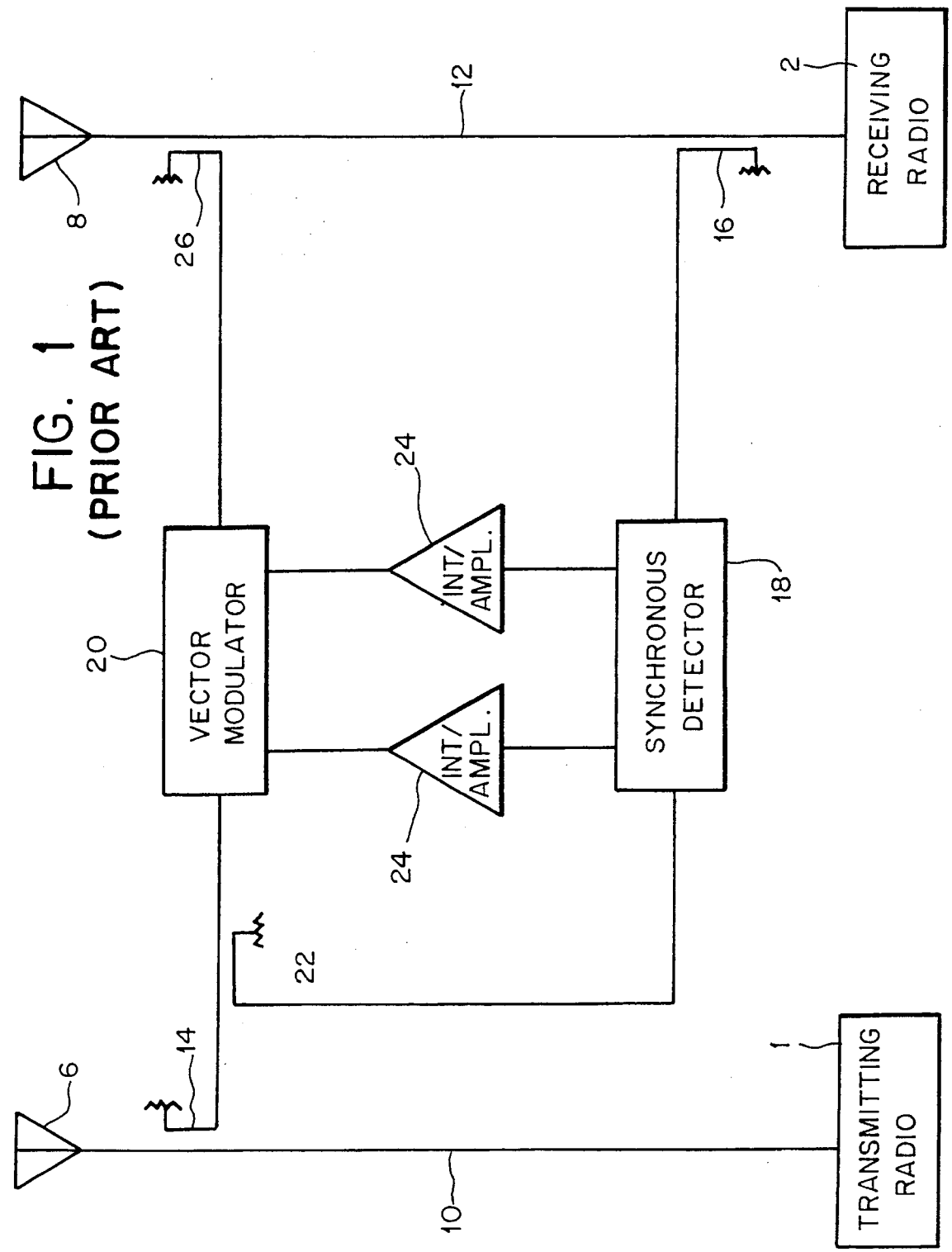
FIG. 1 is a block diagram of a conventional interference cancellation system.

As stated previously, FIG. 1 shows a conventional interference cancellation system which may be ineffective for use with radios situated on a small platform.

One of the problems with a conventional interference cancellation system connected to two radios 1,2 which are situated on a small platform, where each radio includes its own antenna 6,8, is that the coupling between the antennas is so strong that the interfering signal component of the received signal overshadows any cancellation signal generated by the interference cancellation system and, therefore, is not cancelled. The reference signal path, from the reference coupler 14 through the vector modulator 20 to the summing coupler 26, may have 30 dB in losses, whereas the coupling between the transmitting antenna 6 and the receiving antenna 8 may be as low 6 dB.

Another disadvantage with having separate antennas for each radio of the system situated on the small platform is that each antenna distorts the antenna pattern of the other due to the close proximity of the antennas and, as a result, the transmission and receiving capability of the system is affected. Also, because there should be as much spacing between antennas 6,8 as possible, the antennas may have to be situated close to the edges of the small platform rather than centrally. If quarter wave antennas or other types requiring a ground plane are employed, their gain may be decreased because of an insufficient ground plane where each antenna is mounted, such as at the edges of the small platform. The present invention overcomes these problems.

Figure 2:
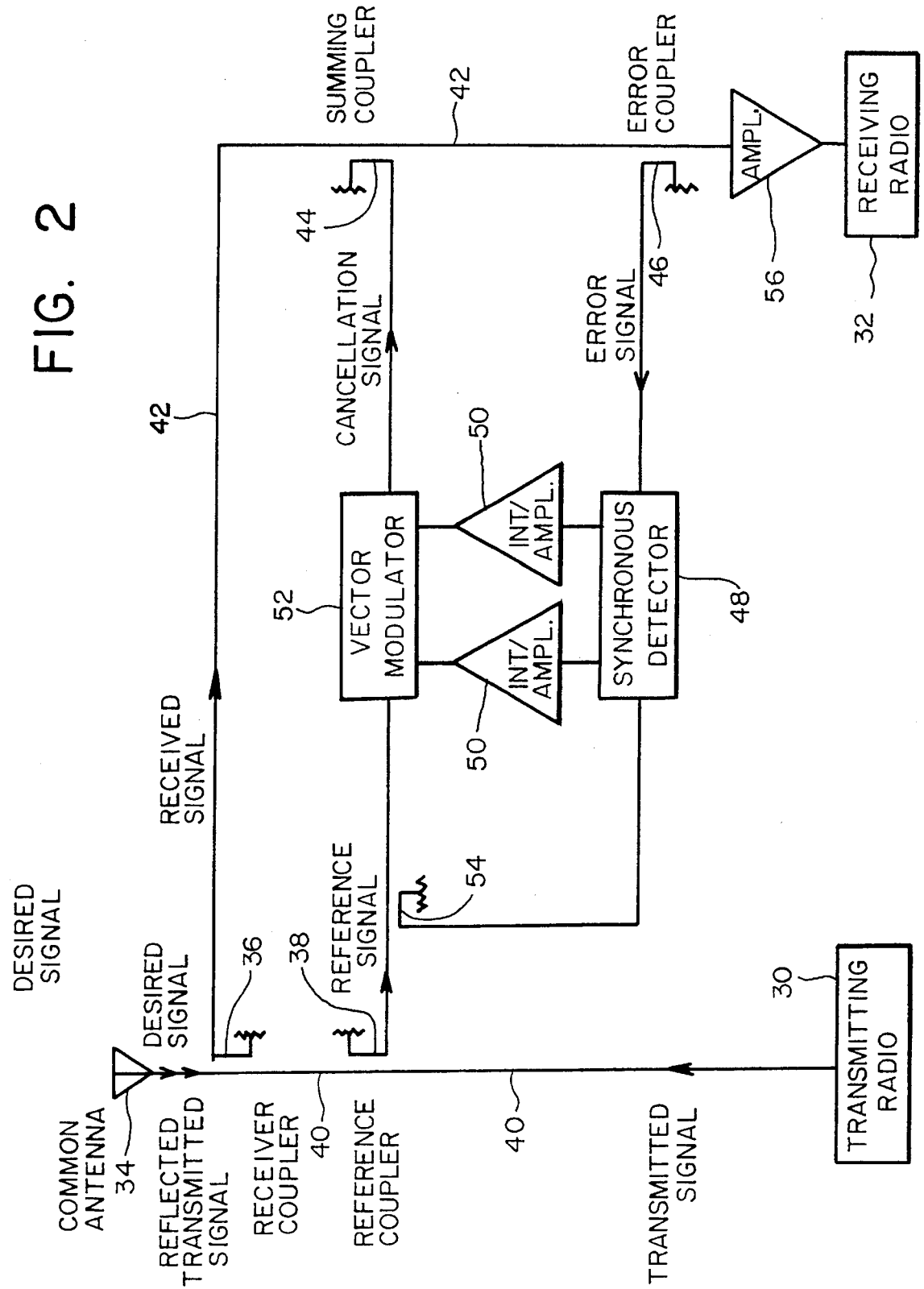
FIG. 2 is a block diagram of an interference cancellation system for use with a plurality of radios situated on a small platform and a radio system employing a common antenna, each being formed in accordance with the present invention.

One form of an interference cancellation system and multiple radio system with interference suppression capabilities constructed in accordance with the present invention is shown in FIG. 2 of the drawings. For illustrative purposes, a radio system having only one transmitting radio 30 and one receiving radio 32 is shown. However, as will be described in relation to the embodiment of the present invention shown in FIG. 3, the interference cancellation system and the radio system having interference suppression capabilities may be expanded to more than one transmitting radio and more than one receiving radio.

First, in accordance with the present invention, the individual antennas of each radio are eliminated and replaced with a common antenna 34 to which each of the radios 30,32 of the system is directly or indirectly coupled. By changing to a common antenna 34 for all of the radios of the system, the high coupling between individual antennas and the distortion in the antenna patterns due to the close proximity of the individual antennas are eliminated. The common antenna 34, which may be a quarter wave antenna or the like to meet size constraints, may now be situated more centrally on the small platform, which may be an aircraft such as a helicopter, and thus provided with a good ground plane as required by such antennas. Thus, an improved antenna with higher gain and lower mismatch (i.e., a VSWR closer to 1) may now be used for the radio system for both receiving and transmitting signals. Because of the more perfect antenna 34 which is used and the decreased mismatch between the antenna and the overall radio system, less of the signal generated by one of the radios of the system which is transmitting is reflected from the antenna.

The conventional radio system, such as shown in FIG. 1, employing separate antennas 6,8 and situated on a small platform would have a rather large interfering signal component of the received signal caused by the close proximity of the transmitting and receiving antennas to each other. However, in accordance with the present invention, it has been realized that this interfering signal component may be substantially reduced if only a single antenna 34 was used for the radio system for both transmitting and receiving and that the single antenna exhibits very little mismatch so very little of the interfering transmitted signal is reflected back into the signal path of the receiving radio 32. On the other hand, the reference signal used in the interference cancellation system of the present invention may be a sample of the full strength transmitted signal. The cancellation signal, which is generated from the reference signal by the interference cancellation system of the present invention, will have sufficient strength to cancel the weaker interfering signal component of the received signal, which component is derived from the weaker reflected transmitted signal. Therefore, the interference cancellation system and the radio system of the present invention for use on small platforms can provide a substantially interference free desired signal to one or more receiving radios of the system while one or more of the other radios of the system are transmitting.

To facilitate an understanding of the invention, FIG. 2 shows the signals which will be referred to in the following description of the interference cancellation system and radio system of the present invention for use on small platforms.

As shown in FIG. 2, the interference cancellation system of the present invention is adapted for use with at least one receiving radio 32 which receives a desired signal and at least one transmitting radio 30 which generates a transmitted signal. The transmitted signal interferes with the ability of the receiving radio 32 to receive the desired signal. The receiving radio 32 and transmitting radio 30 are situated in close proximity to each other. They are directly or indirectly coupled to a common antenna 34 for receiving and transmitting signals, rather than having separate antennas as in a conventional system. Because the common antenna 34 may be more centrally placed on the small platform to provide a better ground plane, it reflects only a small portion of the transmitted signal. This portion is referred to in the following description as a reflected transmitted signal. The reflected transmitted signal may be 20 dB or more lower than the signal which is transmitted through the common antenna 34. This may be referred to as a reflected signal loss, and the path which the transmitted signal takes as it is reflected by the common antenna may be referred to as the reflected signal path, from its reflection from the common antenna 34 to a receiver coupler 36, which will be described in greater detail.

The interference cancellation system includes a reference coupler 38. The reference coupler 38 may be a directional coupler which may be coupled to the transmission line 40 coupling the transmitting radio 30 to the common antenna 34. The reference coupler 38 includes a first input port which is coupled to the transmitting radio 30, a terminated port which is terminated using an appropriate termination, a first output port which, as will be explained, is connected to the transmitting radio's transmission line 40 leading toward the common antenna 34, and a second output port. The reference coupler 38 is responsive to the transmitted signal generated by the transmitting radio 30 of the system and provides on its second output port a reference signal in response to the transmitted signal. This reference signal is a sample of the transmitted signal and will be used for generating a cancellation system to eliminate the interference in the received signal of the receiving radio 32.

As mentioned previously, the interference cancellation system further includes a receiver coupler 36. The receiver coupler 36 is situated in the transmission line 40 of the transmitting radio between the common antenna 34 and the reference coupler 38.

More specifically, the receiver coupler 36 has an input port, which is coupled to the transmission line 40 from the first output port of the reference coupler 38, a terminated port, a first output port which is operatively coupled to the common antenna 34 so that most of the transmitted signal passes through the reference coupler 38 and the receiver coupler 36 to the antenna, and a second output port.

The desired signal, which is desired to be received by the receiving radio 32, is received by the common antenna 34 and passes through the receiver coupler 36 to the receiving radio along the transmission line 42 which effectively couples the receiving radio 32 to the second output port of the receiver coupler 36. The receiver coupler 36 is responsive to not only the desired signal mentioned previously but also the reflected transmitted signal, which is reflected from the common antenna 34, through the receiver coupler 36 and to the receiving radio along the transmission line 42. Thus, the received signal provided to the receiving radio 32 includes an interfering signal component (which will be reduced or eliminated by the cancellation signal) corresponding to the reflected transmitted signal reflected by the common antenna and a desired signal component corresponding to the desired signal received by the common antenna 34. The interference cancellation system of the present invention thus defines what will be referred to in this description as a received signal path from the receiver coupler 36 along the transmission line 42 to a summing coupler 44, which will be described in greater detail. The receiver coupler 36, like the reference coupler 38, may be a directional coupler and may have associated with it an additional 6 dB in losses in a direction from the common antenna 34 to the second output port on which the received signal is provided. Thus, the interfering signal component, which is a sample of the reflected transmitted signal, of the received signal is reduced further in power by the insertion loss of the receiver coupler 36.

The interference cancellation system of the present invention further includes an error coupler 46. The error coupler 46 is coupled to the receiving radio transmission line 42 between the receiving radio 32 and the summing coupler 44, as will be explained. The error coupler 46 may also be in the form of a directional coupler, having an input port, which is connected to the transmission line 42 leading from the summing coupler 44, a terminated port, a first output port to which the receiving radio 32 is coupled, and a second output port. The error coupler 46 is responsive to the received signal and provides on its second output port an error signal in response to the received signal.

The interference cancellation system of the present invention further includes a synchronous detector 48. The synchronous detector 48 has a reference signal port and an error signal port. The reference signal port receives at least a first portion of the reference signal, and the error signal port receives the error signal. The synchronous detector 48 compares the reference signal with the error signal. The detector 48 includes at least one output port and may include first and second output ports as shown in FIG. 2 on which are respectively provided analog in-phase and quadrature phase DC signals that correspond to the amplitude of the residual in-phase and quadrature phase components of the residual interfering signal present after the cancellation signal is injected onto the transmission line 42 of the receiving radio 32, as will be described in greater detail.

The interference cancellation system of the present invention may also include one or more integrators and/or amplifiers 50 which receive the DC output signals of the detector 48 and integrate and/or amplify the DC output signals to thereby generate control signals. These control signals are provided to a vector modulator 52.

A vector modulator 52, also known as a signal controller, which is suitable for use in the interference cancellation system of the present invention is described in U.S. Pat. No. 3,699,444, which issued to Rabindra Ghose and Walter Sauter, the disclosure of which is incorporated herein by reference. This patent also discloses a synchronous detector which is suitable for use in the interference cancellation system of the present invention. In its simplest form, the vector modulator 52 may consist of an in-phase and a quadrature-phase electronic attenuator, each being controllable by a respective DC control signal. One of its inputs is provided with a second portion of the reference signal from the reference coupler 38. The first and second portions of the reference signal may be provided respectively to the synchronous detector 48 and vector modulator 52 by using a directional coupler 54 or the like which is coupled to the reference coupler 38 and which receives the reference signal and divides the reference signal into the first and second portions.

The vector modulator 52 provides a cancellation signal which, in effect, is the reference signal manipulated in amplitude and phase. More specifically, the vector modulator 52 effectively adjusts the phase and amplitude of the second portion of the reference signal (which corresponds to the sampled transmitted signal), and generates a cancellation signal which is adjusted to be substantially equal in amplitude and opposite in phase to the interfering signal component of the received signal and which may be injected onto the transmission line 42 of the receiving radio 32. The vector modulator 52 includes in-phase and quadrature-phase control signal input ports on which are received the control signals to which the vector modulator responds in adjusting the phase and gain of the cancellation signal.

The interference cancellation system of the present invention further includes a summing coupler 44. The summing coupler 44 is coupled to the transmission line 42 of the receiving radio 32. The summing coupler 44 may be in the form of a directional coupler, and may include an input port which receives the received signal from the receiver coupler 36, a terminated port, another input port which receives the cancellation signal from the vector modulator 52, and an output port which is coupled to the transmission line 42 leading to the first input port of the error coupler 46 and on which is provided effectively the received signal corrected by the cancellation signal.

The summing coupler 44 injects the cancellation signal onto the transmission line 42 of the receiving radio to cancel the interfering signal component of the received signal. The output signal of the summing coupler 44 includes the desired signal component of the received signal (i.e., the signal which is desired to be received by the receiving radio 32), and whatever residual interfering signal component remains after the cancellation signal has been injected onto the receiving radio transmission line 42. The interference cancellation system automatically and continuously maintains the amplitude and phase of the cancellation signal for maximum cancellation of the received interference.

Because the reference signal path, which is defined by the reference coupler 38, through the vector modulator 52 and to the summing coupler 44, preferably has a signal loss which is less than or equal to the sum of the signal losses associated with the reflected signal path and the received signal path, the reference signal has sufficient strength to allow the interference cancellation system to act as a loop and cancel the interfering signal component in the received signal. Also, since only a single antenna 34 is used, space and lack of nearby antennas permit the design of an antenna with good input match, thus providing a high return loss for the reflected transmitted signal. This high return loss, combined with the coupling loss in the receiver coupler 36, may easily be made greater than 20 dB. Thus, the power of the interfering signal component of the received signal is greatly reduced.

In a preferred form of the present invention, a low noise amplifier 56 may be included and coupled to the receiving radio transmission line 42 between the first output of the error coupler 46 and the receiving radio 32. The purpose of amplifier 56 is to overcome the losses of the various couplers through which the desired signal passes. The low noise amplifier 56 is not affected by the interfering signal component since the interfering signal component is cancelled at the summing coupler 44 ahead of the input of the amplifier.

It should be further noted that, because only a single antenna 34 is used, there is no distortion of antenna patterns and the common antenna may be centrally located on the small platform. Also, the frequency bands over which the transmitting and receiving radios operate may overlap and both transmitting and receiving radios may operate simultaneously.

Figure 3:
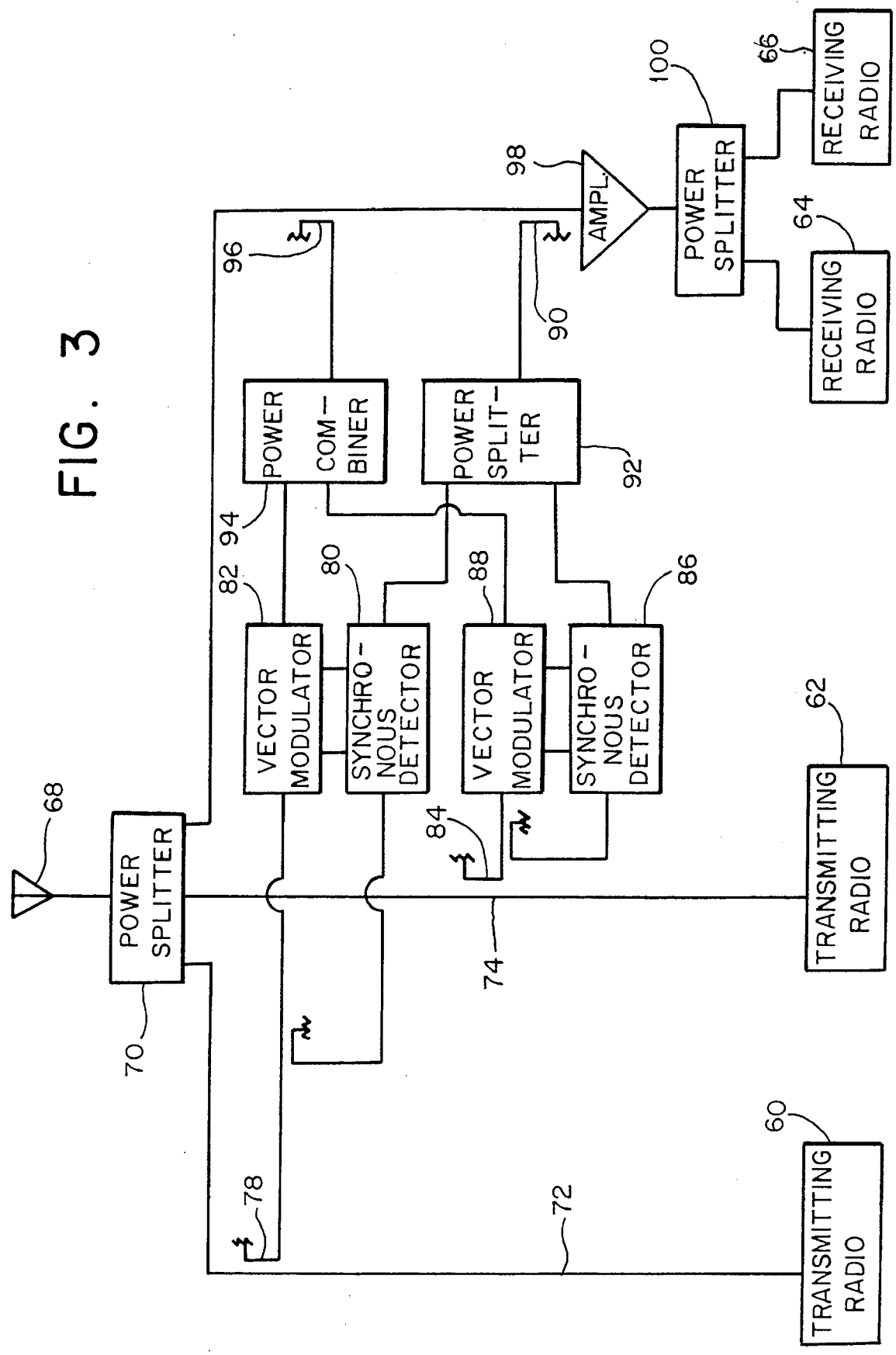
FIG. 3 is a block diagram of another form of an interference cancellation system and radio system formed in accordance with the present invention.

FIG. 3 shows an example of how additional transmitting radios and additional receiving radios may operate simultaneously in the radio system of the present invention and yet be provided with interference suppression capabilities in accordance with the present invention.

In the example shown in FIG. 3, two transmitting radios 60,62 and two receiving radios 64,66 are shown as operating in the radio system using a common antenna 68, although it is envisioned to be within the scope of the invention that an even greater number of transmitting and receiving radios than the number shown in FIG. 3 may be connected with the interference cancellation system of the present invention.

As can be seen from FIG. 3, the common antenna 68 is coupled to the input of a three-way power splitter 70. The first and second transmitting radios 60,62 are respectively coupled to two outputs of the power splitter 70 by respective transmission lines 72,74, and the first and second receiving radios 64,66 are also coupled to a third output of the power splitter 70 with a transmission line 76. All of the individual antennas of each of the transmitting and receiving radios have been eliminated in the embodiment shown in FIG. 3, and the radios 60-66 are coupled to the common antenna 68. Since only a single antenna 68 is used for the system, the antenna may be designed with good input match so that only a small portion of the signals generated by the first and second transmitting radios 60,62 are reflected back (i.e., the common antenna 68 has a high return loss, which may be in the range of 15 dB to 20 dB or more). The three-way power splitter 70 also provides additional loss for the reflected transmitted signals, for example, an additional 6 dB. Thus, the three-way power splitter effectively acts as the receiver coupler 36 shown in FIG. 2 to provide a received signal on the transmission line 76 of the first and second radio receivers 64,66, which received signal includes an interfering signal component corresponding to the reflected transmitted signals from the first and second transmitting radios 60,62 as well as a desired signal component from a desired signal received by the common antenna 68.

In the embodiment shown in FIG. 3, since there are two transmitting radios, two interference cancellation systems are provided, which cancellation systems are coupled together, as will be described.

The first interference cancellation system includes a reference coupler 78 which is coupled to transmission line 72 and which is responsive to the transmitted signal from the first transmitting radio 60 and provides a reference signal in response to the transmitted signal. The first interference cancellation system also includes a synchronous detector 80, which is responsive to a first portion of the reference signal and to a first error signal, as will be described, and generates at least one detector output signal in response to the first error signal and the reference signal.

The first interference cancellation system also includes a vector modulator 82, the vector modulator 82 being responsive to the detector output signal from the synchronous detector 80 and to a second portion of the reference signal and generating a first cancellation signal in response to the detector output signal and the reference signal.

The second interference cancellation system is coupled to the transmission line 74 of the second transmitting radio 62, and includes a reference coupler 84 which is responsive to the transmitted signal from the second transmitting radio 62 and provides a second reference signal in response to this transmitted signal.

The second interference cancellation system also includes a second synchronous detector 86, which is responsive to a first portion of the second reference signal and to a second error signal, which will be described, and generates at least one second detector output signal in response to the second error signal and the second reference signal.

The second interference cancellation system also includes a second vector modulator 88. The second vector modulator 88 is responsive to a second portion of the second reference signal and to the second detector output signal and generates a second cancellation signal in response to the second detector output signal and the second reference signal.

In order to generate the first and second error signals, an error coupler 90 is provided and which is coupled to the transmission line 76 of the first and second receiving radios 64,66. The error coupler 90 is responsive to the received signal and provides an error signal in response to the received signal. This error signal is provided to a power splitter 92, which divides the error signal into the first and second error signals and provides the first and second error signals to the synchronous detectors 80,86 of the first and second cancellation systems, respectively.

The vector modulators 82,88 of the first and second interference cancellation systems adjust their respective cancellation signals in amplitude and phase so that they are substantially equal in amplitude and opposite in phase to the corresponding portions of the interfering signal component of the received signal. The cancellation signals are provided to the respective inputs of a power combiner 94, which sums the two cancellation signals together and provides a summed cancellation signal on its output. The summed cancellation signal is provided to one input of a summing coupler 96 which is coupled to the transmission line 76 of the first and second receiving radios 64,66. The summing coupler 96 injects the summed cancellation signal onto the transmission line 76 to cancel the interfering signal component of the received signal, leaving the desired signal to be received by the first and second receiving radios 64,66.

The two interference cancellation systems may include the various components mentioned previously and shown in FIG. 2, such as the integrators/amplifiers 50, or other components shown in FIG. 2, and the components may be coupled together as described in relation to the interference cancellation system shown in FIG. 2.

The system shown in FIG. 3 may further include a low noise amplifier 98 coupled to the transmission line 76 that leads from the error coupler 90, in much the same way as the interference cancellation system of the present invention shown in FIG. 2 and described previously.

The first and second receiving radios 64,66 may be coupled to the receiver transmission line 76 using a two-way power splitter 100. The input of the two-way splitter may be coupled to the output of the low noise amplifier 98, and the outputs of the two-way splitter 100 may be coupled respectively to the first and second receiving radios 64,66. In this way, the received signal may be provided to both of the receiving radios.

It is of course envisioned to be within the scope of the invention to expand the system shown in FIG. 3 by including even more transmitting radios and additional receiving radios. Additional interference cancelers would be included for additional transmitting radios. The power combiner 94 and power splitters 70,92,100 used to couple the radios to the common antenna 68, provide cancellation signals to the summing coupler 96, provide the error signals to the various interference cancelers used in the system and provide the received signal to the plurality of receiving radios may be replaced with N-way power combiners or power splitters, where N is an integer greater than one.

The radio system and interference cancellation system of the present invention for use on small platforms overcome the disadvantages of conventional systems. Since only a single antenna is used for the multiple radios of the system, the antenna may be situated centrally on the small platform to provide a better ground plane. Multiple radios may be connected to this single antenna and to the interference cancellation system of the present invention and operated without the deleterious effects of high levels of interference or antenna pattern degradation.

Also, the low isolation between the closely located antennas of the conventional system is overcome by the present invention. Since a single antenna is used, space and lack of nearby antennas permit the design of an antenna with good input match, thus providing a high return loss for the reflected transmitted signal. This high return loss combined with the coupling loss in the receiver coupler or the three-way power splitter can be easily made to be greater than 20 dB. Thus, the power of the interfering signal received by the receiving radios is greatly reduced. Also, the difference between the power of the transmitted signal and the power of the interfering signal to be cancelled are comparable to the losses in the vector modulator and the couplers in the reference signal path. This makes interference cancellation feasible since the coupled reference signal power is now adequate to cancel the interference in the received signal.

Since only a single antenna is used, and there is no distortion of antenna patterns as in a conventional radio system mounted on a small platform with closely spaced antennas, the range capability of the communication link served by the radio system of the present invention is enhanced. Also, with the present invention, the coupling path from the transmitting radio to the receiving radio occurs only by signal reflection from the common antenna and through the receiver coupler, thereby providing high isolation for the interfering signal, but not affecting to any appreciable degree the reception of the desired signal through the antenna by the receiving radio.

It should be realized that the radios shown in FIGS. 2 and 3 may be transceivers with both transmitting and receiving capabilities. If the transmitting radio is to be switched to receiving, and the receiving radio is to be switched to transmitting, interference cancellation may still be provided. The connection of the radios to the interference cancellation system is merely changed by using appropriate switches in their respective transmission lines leading from the radios, so that the receiving radio which was formally transmitting is switched over to be coupled to the first output port of the error coupler, and the transmitting radio which was formally receiving is switched over to be coupled to the input port of the reference coupler.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An interference cancellation system for use with at least one receiving radio receiving a desired signal and at least one transmitting radio generating a transmitted signal which interferes with the desired signal, the at least one receiving radio and the at least one transmitting radio being situated in close proximity to each other and having a common antenna for receiving and transmitting signals, the common antenna reflecting a portion of the transmitted signal to generate a reflected transmitted signal, the interference cancellation system comprising:

a reference coupler, the reference coupler being responsive to the transmitted signal and providing a reference signal in response thereto;

a receiver coupler, the receiver coupler being responsive to the reflected transmitted signal and to the desired signal and providing a received signal in response thereto, the received signal including an interfering signal component corresponding to the reflected transmitted signal and a desired signal component corresponding to the desired signal;

an error coupler, the error coupler being responsive to the received signal and providing an error signal in response thereto;

a synchronous detector, the synchronous detector being responsive to the error signal and to a first portion of the reference signal and generating at least one detector output signal in response thereto;

a vector modulator, the vector modulator being responsive to the at least one detector output signal and to a second portion of the reference signal and generating a cancellation signal in response thereto, the cancellation signal being adjusted by the vector modulator to be substantially equal in amplitude and opposite in phase to the interfering signal component of the received signal; and a summing coupler, the summing coupler being responsive to the received signal and to the cancellation signal and being provided for summing the cancellation signal and the received signal to thereby cancel the interfering signal component from the received signal.

2. An interference cancellation system as defined by claim 1, which further comprises at least one of an integrator and an amplifier, the at least one of an integrator and an amplifier being responsive to the at least one detector output signal and generating a control signal in response thereto, the vector modulator being responsive to the control signal for generating the cancellation signal.

3. An interference cancellation system as defined by claim 1, wherein the reference coupler, vector modulator and summing coupler define a reference signal path, the reference signal path having a reference signal loss associated therewith;

wherein the common antenna has a reflected signal loss associated therewith;

wherein the receiver coupler and summing coupler define a received signal path, the received signal path having a received signal path loss associated therewith; and wherein the reference signal path loss is one of less than and equal to the sum of the reflected signal loss and the received signal path loss.

4. An interference cancellation system as defined by claim 1, wherein the interference cancellation system defines a reference signal path from the reference coupler to the summing coupler, the reference signal path having a reference signal path loss associated therewith;

wherein the interference cancellation system defines a reflected signal path which the transmitted signal and the reflected transmitted signal take when the transmitted signal is reflected by the common antenna to generate the reflected transmitted signal, the reflected signal path having a loss associated therewith;

wherein the interference cancellation system defines a received signal path from the receiver coupler to the summing coupler, the received signal path having a received signal path loss associated therewith; and wherein the reference signal path loss is at most equal to the sum of the reflected signal path loss and the received signal path loss.

5. An interference cancellation system as defined by claim 1, which further comprises a low noise amplifier, the low noise amplifier being operatively coupled between the error coupler and the at least one receiving radio.

6. An interference cancellation system as defined by claim 1, which further comprises an N-way power splitter, the N-way power splitter having an input and N outputs, where N is an integer greater than 1, the input of the N-way power splitter being operatively coupled to the error coupler, one of the N outputs being operatively coupled to the at least one receiving radio, and at least another of the N outputs being operatively coupled to at least another receiving radio.

7. An interference cancellation system as defined by claim 1, wherein the interference cancellation system further comprises an N-way power splitter, the N-way power splitter being responsive to the received signal and providing N output signals in response thereto, where N is an integer greater than 1;

wherein the at least one receiving radio is responsive to one of the N output signals; and wherein at least another receiving radio is responsive to at least another of the N output signals.

8. An interference cancellation system for use with at least one receiving radio receiving a desired signal and a first transmitting radio generating a first transmitted signal which interferes with the desired signal and at least a second transmitting radio generating at least a second transmitted signal which interferes with the desired signal, the at least one receiving radio and the first and at least second transmitting radios being situated in close proximity to one another and having a common antenna for receiving and transmitting signals, the common antenna reflecting a portion of the first transmitted signal to generate a first reflected signal and reflecting a portion of the at least second transmitted signal to generate at least a second reflected signal, the interference cancellation system comprising:

an N-way power splitter, where N is an integer greater than one, the N-way power splitter being responsive to the first reflected transmitted signal and to the at least second reflected transmitted signal and to the desired signal and providing a received signal in response thereto, the received signal including an interfering signal component corresponding to the first reflected transmitted signal and to the at least second reflected transmitted signal and a desired signal component corresponding to the desired signal;

a first reference coupler, the first reference coupler being responsive to the first transmitted signal and providing a first reference signal in response thereto;

at least a second reference coupler, the at least second reference coupler being responsive to the at least second transmitted signal and providing at least a second reference signal in response thereto;

means responsive to the received signal and providing a first error signal and at least a second error signal in response thereto;

a first synchronous detector, the first synchronous detector being responsive to the first error signal and a first portion of the first reference signal and generating at least one first detector output signal in response thereto;

at least a second synchronous detector, the at least second synchronous detector being responsive to the at least second error signal and to a first portion of the at least second reference signal and generating at least one second detector output signal in response thereto;

a first vector modulator, the first vector modulator being responsive to the at least one first detector output signal and to a second portion of the first reference signal and generating a first cancellation signal in response thereto;

at least a second vector modulator, the at least second vector modulator being responsive to the at least one second detector output signal and to a second portion of the at least second reference signal and generating at least a second cancellation signal in response thereto; and means responsive to the received signal and to the first cancellation signal and to the at least second cancellation signal and being provided for summing the first and at least second cancellation signals and the received signal to thereby cancel the interfering signal component from the received signal.

9. A radio system having interference suppression capabilities, which comprises:

at least one receiving radio receiving a desired signal;

at least one transmitting radio generating a transmitted signal which interferes with the desired signal, the at least one receiving radio and the at least one transmitting radio being situated in close proximity to each other;

a common antenna, the common antenna being operatively coupled to the at least one receiving radio and the at least one transmitting radio and being provided for receiving and transmitting signals, the common antenna reflecting a portion of the transmitted signal to generate a reflected transmitted signal;

a reference coupler, the reference coupler being responsive to the transmitted signal and providing a reference signal in response thereto;

a receiver coupler, the receiver coupler being responsive to the reflected transmitted signal and to the desired signal and providing a received signal in response thereto, the received signal including an interfering signal component corresponding to the reflected transmitted signal and a desired signal component corresponding to the desired signal;

an error coupler, the error coupler being responsive to the received signal and providing an error signal in response thereto;

a synchronous detector, the synchronous detector being responsive to the error signal and to a first portion of the reference signal and generating at least one detector output signal in response thereto;

a vector modulator, the vector modulator being responsive to the at least one detector output signal and to a second portion of the reference signal and generating a cancellation signal in response thereto, the cancellation signal being adjusted by the vector modulator to be substantially equal in amplitude and opposite in phase to the interfering signal component of the received signal; and a summing coupler, the summing coupler being responsive to the received signal and to the cancellation signal and being provided for summing the cancellation signal and the received signal to thereby cancel the interfering signal component from the received signal.

10. In combination:

a radio system, the radio system including:

at least one receiving radio receiving a desired signal;

at least one transmitting radio generating a transmitted signal which interferes with the desired signal, the at least one receiving radio and the at least one transmitting radio being situated in close proximity to each other; and a common antenna operatively coupled to the at least one receiving radio and the at least one transmitting radio and being provided for receiving and transmitting signals, the common antenna reflecting a portion of the transmitted signal to generate a reflected transmitted signal; and an interference cancellation system coupled to the radio system, the interference cancellation system including:

a reference coupler, the reference coupler being responsive to the transmitted signal and providing a reference signal in response thereto;

a receiver coupler, the receiver coupler being responsive to the reflected transmitted signal and to the desired signal and providing a received signal in response thereto, the received signal including an interfering signal component corresponding to the reflected transmitted signal and a desired signal component corresponding to the desired signal;

an error coupler, the error coupler being responsive to the received signal and providing an error signal in response thereto;

a synchronous detector, the synchronous detector being responsive to the error signal and to a first portion of the reference signal and generating at least one detector output signal in response thereto;

a vector modulator, the vector modulator being responsive to the at least one detector output signal and to a second portion of the reference signal and generating a cancellation signal in response thereto, the cancellation signal being adjusted by the vector modulator to be substantially equal in amplitude and opposite in phase to the interfering signal component of the received signal; and a summing coupler, the summing coupler being responsive to the received signal and to the cancellation signal and being provided for summing the cancellation signal and the received signal to thereby cancel the interfering signal component from the received signal.

11. A method of receiving and transmitting signals in a radio system, the radio system having at least one receiving radio receiving a desired signal and at least one transmitting radio generating a transmitted signal which interferes with the desired signal, the at least one receiving radio and the at least one transmitting radio having a common antenna for receiving and transmitting signals, which comprises the steps of:

reflecting from the common antenna a portion of the transmitted signal to generate a reflected transmitted signal;

sampling the transmitted signal and providing a reference signal in response thereto;

sampling the reflected transmitted signal and the desired signal and providing a received signal in response thereto, the received signal including an interfering signal component corresponding to the reflected transmitted signal and a desired signal component corresponding to the desired signal;

sampling the received signal and providing an error signal in response thereto;

comparing the error signal and a first portion of the reference signal and generating at least a first signal in response thereto;

generating a cancellation signal in response to the at least first signal and to a second portion of the reference signal, and adjusting the cancellation signal so that the cancellation signal is substantially equal in amplitude and opposite in phase to the interfering signal component of the received signal; and summing the cancellation signal and the received signal to thereby cancel the interfering signal component from the received signal.

* * * * *